May 14, 1929.  G. F. MOOREHEAD  1,712,896
REFRIGERATOR SHOW CASE
Filed Oct. 4, 1926
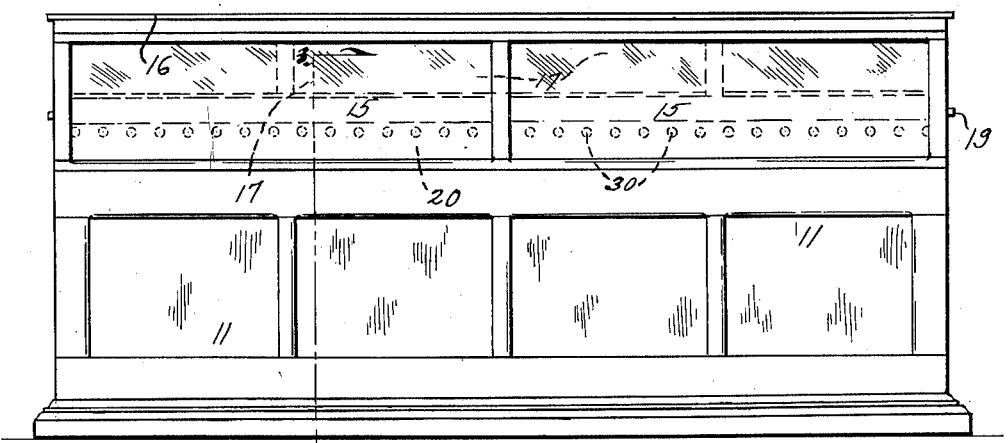
Fig. 1.
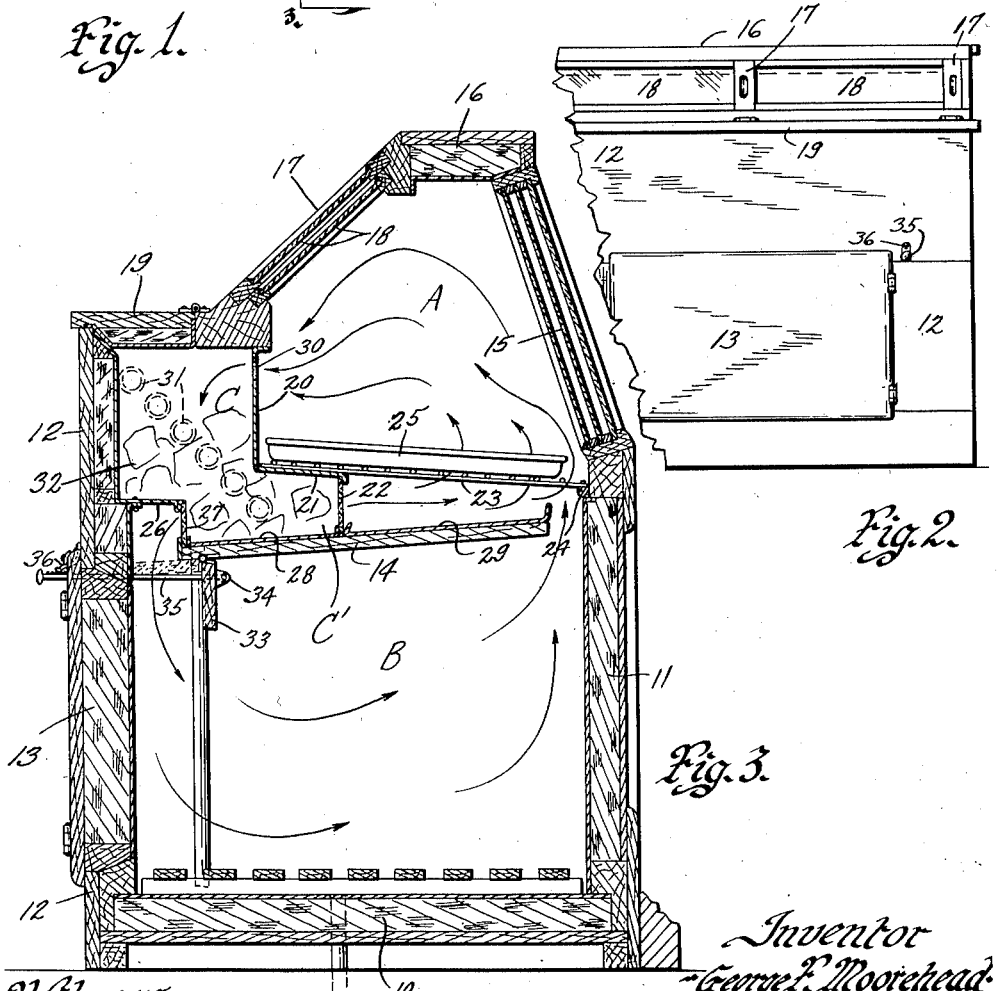
Fig. 2.
Fig. 3.
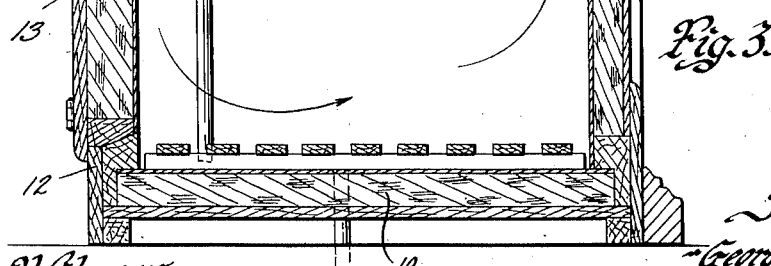

Patented May 14, 1929.

1,712,896

UNITED STATES PATENT OFFICE.

GEORGE F. MOOREHEAD, OF DES MOINES, IOWA.

REFRIGERATOR SHOW CASE.

Application filed October 4, 1926. Serial No. 139,352.

My invention relates to refrigerator show cases.

It is my purpose to provide a refrigerator show case of efficient construction, having the display compartment, a storage compartment and a refrigerant compartment, all so arranged relative to each other as to provide for a double circulation from the refrigerant compartment directly to the display compartment and indirectly through the storage compartment and thence through the display compartment.

In this connection, it is my purpose to provide a novel structure, whereby such circulation may be effectively secured.

With these and other objects in view, my invention consists in the construction, arrangement and combination of the various parts of my refrigerator show case, whereby the objects contemplated are attained, as hereinafter more fully set forth, pointed out in my claims, and illustrated in the accompanying drawings, in which:

Figure 1 is a front elevation of a refrigerator show case embodying my invention.

Figure 2 is a rear elevation of one end of the show case; and

Figure 3 is a detail, sectional view taken on the line 3—3 of Figure 1.

In the accompanying drawings wherein I have illustrated a form in which my invention may be embodied, I have shown a show case having the display compartment indicated by the reference character A, the storage compartment below it indicated by the character B and the refrigerant compartment C.

The storage compartment has the usual bottom member 10 and front and rear wall members 11 and 12 of heat insulating character.

The storage compartment B is provided at the back with a series of doors 13.

The rear wall 12 of the storage compartment extends higher than the front wall 11 as shown. This is to afford a convenient structure for providing the refrigerant and display compartment.

At the top of the storage compartment B is a partition member 14, which separates the storage compartment from the refrigerant and display compartments, which is inclined from its rearward end upwardly and forwardly to facilitate circulation of air currents.

The display compartment is of that type in which the contents may be visible from the front of the case and also from the rear. It has the rearwardly and upwardly inclined front wall 15, preferably of three spaced panes of glass and a relatively narrow flat top 16, and the rear wall 17 made up of sliding doors having the panes of glass 18 therein, for affording convenient access to the interior of the display compartment.

The top of the refrigerant compartment C is provided with a series of hinged doors 19 to afford access to that compartment.

An upright partition member 20 of any suitable material for the purpose extends downwardly from the upper, forward part of the refrigerant compartment and separates that compartment from the display compartment.

A partition member 21 extends forwardly and downwardly from the lower edge of the member 20 and is spaced substantially above the partition member 14, so that the refrigerant compartment C has a portion C′ projected under the lower, rear part of the display compartment.

At the front of the portion C′ of the refrigerant compartment C is a foraminous, substantially vertical partition 22 between the members 21 and 14.

A removable grating 23 rests on the member 21 and is inclined downwardly and forwardly to the front wall 11, where it rests upon the suitable support or shelf 24. Trays 25 of any suitable size or shape for holding meat, vegetables or other food products may be placed on the grating 23.

In order to allow circulation from the refrigerant compartment downwardly into the rear part of the storage compartment, I have provided above the level of the lower end of the partition 14 a short, horizontal partition member 26 projecting from the rear wall 12 forwardly.

The partition 14 is preferably made to terminate at its rear edge short of the wall 12 and below the forward edge of the partition member 26.

A foraminous partition 27 extends downwardly from the forward edge of the partition 26 to the rear edge of the partition 14.

On the partition 14 between the members 22 and 27, I preferably provide a pan 28 to hold ice or water. On the forward part of the partition 14, I preferably provide a similar pan 29 to receive drippings from the display compartment.

In the upper part of the partition member 20 are a series of holes 30 for affording air circulation.

When a mechanical refrigerant 31 or ice 32 and brine are placed in the refrigerant compartment C, it will, of course, be seen that the colder air will drop to the bottom of that compartment and lie along the partition 14. The cold air will divide and some of it will pass through the partition 22 and thence upwardly into the display compartment and thence through the holes 30 to the upper part of the refrigerant compartment. Some of the cold air in the bottom of the refrigerant compartment will pass through the partition 27 and downwardly into the storage compartment and thence upwardly around the front end of the partition 14 into the display compartment from whence the current of air passes through the holes 30 to the refrigerant compartment.

The partition 14 is inclined to facilitate this air circulation.

The storage compartment may be used for instance for keeping meat where it will be readily accessible to the salesmen.

In order to control the circulation, I have provided a suitable means for closing the passage from the compartment C to the compartment D. As shown, there is provided a door member 33 hinged to the lower rear part of the partition 14. At one end of the door 33 is a lug 34 to which is pivoted a rod 35 slidably extended through the wall 12 and adapted to be held in any position of adjustment by a spring 36.

By adjusting the closure member 33, the passage from the refrigerant compartment C to the storage compartment B can be regulated in size or entirely closed.

I provide in the present show case a piece of equipment, which can be used both for storage and display and which is particularly adapted for use in small butcher shops, delicatessens, grocery stores and the like.

Products not on display may be kept in the compartment B and cold air from the refrigerant compartment will circulate through both the storage and display compartments. The flow of air through the storage compartment can be regulated and this will, of course, serve to regulate the flow of air through the display compartment.

The refrigerant compartment is provided with a portion C' projecting under the rear part of the display compartment for insuring circulation through the partition 22 and for insuring the passage of a current of air toward the front portion of the display compartment. This avoids circulation of air from the refrigerant compartment to the rear part only of the display compartment, which might leave a pocket at the middle of the display compartment where circulation is poor.

It will be noted that the display compartment is higher than the refrigerant compartment and that its rear wall is inclined from the refrigerant compartment upwardly and forwardly and is transparent.

This structure makes it convenient to see into the display compartment from behind and at the same time facilitates the circulation of air from the display compartment to the upper part of the refrigerant compartment.

The case may be used as a combined display and storage case, or either may be used separately and without the other.

I claim as my invention:

1. In a refrigerator show case, a lower storage compartment, a display compartment above said storage compartment, an intermediate compartment between the storage and the display compartments and a refrigerant compartment above said storage compartment and back of said display and said intermediate compartments whereby a circulation of air is maintained forward through said storage and said intermediate compartments, backward through said display compartment and downward through said refrigerant compartment.

2. In a refrigerator show case, a lower storage compartment, a display compartment above said storage compartment, an intermediate compartment between the storage and the display compartments and a refrigerant compartment above said storage compartment and back of said display and said intermediate compartments whereby a circulation of air is maintained forward through said storage and said intermediate compartments, backward through said display compartment and downward through said refrigerant compartment, the air circulating through said storage compartment, also circulating through said display compartment.

Des Moines, Iowa, September 22, 1926.

GEORGE F. MOOREHEAD.